3,363,014
ISOMERIZATION OF OLEFINIC HYDROCARBONS
Edmund T. Kittleman, Donald L. Crain, and Roger F. Kleinschmidt, Bartlesville, Okla., assignors to Phillips Petroleum Company, a corporation of Delaware
No Drawing. Filed Apr. 4, 1966, Ser. No. 539,642
8 Claims. (Cl. 260—666)

ABSTRACT OF THE DISCLOSURE

Isomerization of olefinic hydrocarbons is carried out in the presence of a catalyst formed by mixing (1) a Group VIB metal hexacarbonyl, (2) a compound of the group consisting of monocarboxylic acids, beta diketones, beta ketoesters and beta diesters and (3) a stabilizer of the formula

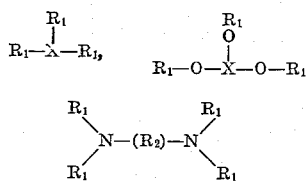

wherein each $R_1$ is selected from the group consisting of alkyl, aryl, cycloalkyl and combinations thereof, $R_2$ is selected from the group consisting of alkylene and alkylazaalkylene, radicals containing from 2 to 6 carbons atoms, and X is selected from the group consisting of phosphorus, arsenic and antimony.

---

This invention relates to a process for the isomerization of olefinic compounds.

A wide variety of catalysts are known in the art to have some effectiveness for the isomerization of olefins. Within this group of catalysts, certain materials will effect the shifting of double bonds without causing skeletal rearrangement, but the activity of these catalysts is low, thus limiting conversion and yields.

It is also known, for example, that 3-ethylidenecyclohexene can be prepared from 4-vinylcyclohexene by isomerization in the presence of a basic catalyst. 3-ethylidenecyclohexene is useful in such areas as polymerization, but the yields of this compound obtained by the process of the prior art are not sufficiently high to make the process attractive from an economic standpoint.

It is the object of this invention to provide a new process for the isomerization of double bonds in olefinic hydrocarbons.

Another object of this invention is to provide a process for the conversion of 4-vinylcyclohexene to 3-ethylidenecyclohexene in good yield without causing skeletal rearrangement.

Other objects, aspects and the several advantages of the invention will become apparent to one skilled in the art upon consideration of the accompanying disclosure.

In copending application Ser. No. 540,088, a process is disclosed for the isomerization of olefins which substantially overcomes the deficiencies of the prior art methods. Olefinic materials are effectively isomerized by a process utilizing molybdenum hexacarbonyl together with acidic materials. The present invention is concerned with an improvement on that process which makes it even more valuable.

According to the process of this invention, shifting of double bonds in olefinic hydrocarbons is effected by Group VIB metal, namely, chromium, tungsten, and molybdenum hexacarbonyls, and a second compound, said contacting being carried out in the presence of a stabilizer compound.

The mole ratio of second compound to Group VIB metal hexacarbonyl is in the range from 0.5/1 to 100/1. The mole ratio of Group VIB metal hexacarbonyl to olefinic hydrocarbon is within the range of from 0.001 to 0.1. The mole ratio of stabilizer compound to second material is generally within the range between 0.5/1 and 2.0/1. The isomerization reaction temperature is within the range of from 100 to 300° C. Reaction times will generally extend from a few minutes to 24 hours, although longer times can be used if desired. It is to be understood that longer reaction times will normally be used at lower reaction temperatures and vice versa.

When molybdenum hexacarbonyl is used in the catalyst system, the catalyst components can be brought together in any order either in the presence or absence of the olefin to be isomerized. It is presently preferred to add the components to the olefin charge at a temperature below that of the isomerization temperature. The temperature of the reaction mixture can then immediately be raised to the desired operating temperature.

When tungsten or chromium hexacarbonyls are used in the catalyst system, it is necessary to first react the stabilizer with the tungsten or chromium hexacarbonyl at an elevated temperature, such as 100–200° C., prior to contact with the second compound and olefin. This reaction between the hexacarbonyl and the stabilizer is preferably carried out in the presence of a diluent. Any inert diluent such as an ether or hydrocarbon can be used, but diglyme [bis(2 - methoxyethyl)ether] is preferred. This reaction product can then be contacted with the second compound and olefin and brought to the desired isomerization temperature.

A wide variety of second compounds can be used in conjunction with the Group VIB metal hexacarbonyl in the isomerization process of this invention. Suitable compounds which can be employed include monocarboxylic acids, beta diketones, beta ketoesters, beta cyanoesters, and beta diesters generally containing from 2 to 18 carbon atoms. Specific compounds within these groups which can be employed are acetic acid, propionic acid, butyric acid, benzoic acid, pentanoic acid, octanoic acid, stearic acid, acetylacetone, 2,4 - hexanedione, 3,5 - heptanedione, 4,6-decanedione, ethyl acetoacetate, methyl acetoacetate, phenyl acetoacetate, ethyl cyanoacetate, 3-oxa-4,6-hendecanedione, diethylmalonate, dimethylmalonate, phenyl methylmalonate, butyl n-propyl malonate and the like.

The materials which can be employed as stabilizers are represented by the formulas:

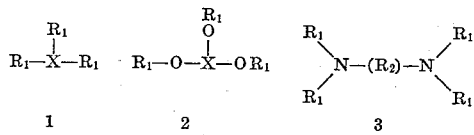

| 1 | 2 | 3 | wherein each $R_1$ is selected from the group consisting of alkyl, aryl, cycloalkyl and combinations thereof such as alkaryl, aralkyl, and the like, containing from 1 to 10 carbon atoms, inclusive, $R_2$ is selected from the group consisting of alkylene and alkylazaalkylene radicals containing from 2 to 6 carbon atoms, inclusive, and X is selected from the group consisting of phosphorus, arsenic and antimony.

Some examples of compounds of Formulas 1, 2 and 3 above which can be employed in the process of this invention are:

trimethylphosphine,
triethylphosphine,
trisecbutylphosphine,
tritertdecylphosphine,
triphenylphosphine, trinaphthylphosphine,
tri-p-tolyphosphine,
tricyclohexylphosphine,
tri-n-propylarsine,
tri-sec-octylarsine,
tri(4-n-butylphenyl)arsine,
tri-n-nonylstibine,
triphenylstibine,
tri(4-methylphenyl)stibine,
tri-methylphosphite,
triethylphosphite,
triphenylphosphite,
trimethylarsenite,
triethylarsenite,
triphenylarsenite,
tricyclohexylarsenite,
trimethylstibonite,
triphenylstibonite,
N,N,N',N'-tetramethylethylenediamine,
N,N,N',N'',N''-pentaethyldiethylenetriamine,
N,N,N',N'-tetraphenylhexane-1,6-diamine and the like.

The isomerization process of this invention is broadly applicable to the shifting of double bonds in olefinic hydrocarbons, including hydrocarbons and hydrocarbons containing multiple double bonds. The olefinic hydrocarbons can be cyclic or acyclic and can contain from 4 to about 20 carbon atoms per molecule.

When 4-vinylcyclohexene is isomerized by the process of this invention, both 3-ethylidenecyclohexene and 4-ethylidenecyclohexene can be formed during the reaction. However, it is recognized that 3-ethylidenecyclohexene can polymerize, and that the rate of its disappearance may be essentially equal to its rate of formation so that very little, if any, of the compound will be recoverable. For this reason, care must be taken in choosing the conditions, acid rates, etc., when one desires to obtain a maximum amount of 3-ethylidenecyclohexene. Generally speaking, strong acids, high acid concentrations and long reaction periods tend to promote polymerization. By operating at a mole ratio of acid compound to Group VIB metal hexacarbonyl of approximately 1/1, one can obtain 3-ethylidenecyclohexene as a predominant product by operating in the presence of a previously described stabilizer. Furthermore, by utilizing a stabilizer, a higher mole ratio of acid compound to molybdenum compound can be effectively utilized. Operation in this fashion gives higher conversions and much faster reaction rates.

The following specific example is intended to illustrate the advantages of the process of this invention, but it is not intended that the invention be limited to the specific features shown.

EXAMPLE I

A series of runs to isomerize 4-vinylcyclohexene with the catalyst of this invention using a wide variety of second compounds and a variety of phosphite and phosphine compounds as stabilizers was carried out. The mixtures of 4-vinylcyclohexene, molybdenum hexacarbonyl, stabilizer and second compound was refluxed under a nitrogen atmosphere to effect the isomerization after which the $C_8$ isomers present, that is, the produced ethylidenecyclohexenes and unconverted 4-vinylcyclohexene, were separated from heavy materials by fractionation at 15 mm. mercury absolute pressure. At least a trace amount of heavy materials were formed in each run. The amount of ethylidenecyclohexene and the specific amounts of each ethylidenecyclohexene isomer present in the $C_8$ fraction were then determined by gas-liquid chromatography. The details of these runs are given below in Table I. The data in Table I clearly show the profound effect on conversion obtained when a suitable stabilizer is added to the isomerization catalyst system. Conversions are greatly improved and loss of olefin feed to the formation of heavy materials is reduced. It can also be seen from the runs shown in Table I that one can vary the conversion and the produced amounts of each of the ethylidenecyclohexene isomers by proper selection of the particular second compound, the second compound to molybdenum compound mole ratio, the stabilizer, and the reaction time.

TABLE I.—ISOMERIZATION OF 4-VINYLCYCLOHEXENE (VCH)

| Run No. | Reaction Charge | | | | | | Refluxing Time, hrs. | $C_8$ Recovered, Percent | Products,[1] wt. percent of $C_8$ | | |
|---|---|---|---|---|---|---|---|---|---|---|---|
| | VCH, moles | Mo(CO)$_6$, moles | Acid | Moles | Stabilizer | Moles | | | 4-ECH | 3-ECH | Total ECH |
| 1 | 0.4 | 0.02 | Ethyl Acetoacetate | 0.01 | None | | 4.5 | 82 | 5.9 | 17.8 | 23.7 |
| 2 | 0.8 | 0.01 | do | 0.01 | Triphenyl Phosphine | 0.02 | 2 | 95 | 21.2 | 77.5 | 98.7 |
| 3 | 0.8 | 0.01 | do | 0.01 | do | 0.02 | [2] 10.5 | 93 | 4.3 | 95.1 | 99.4 |
| 4 | 1.2 | 0.01 | do | 0.01 | do | 0.04 | 8 | 96 | 40.3 | 57.8 | 98.1 |
| 5 | 0.4 | 0.01 | do | 0.01 | Triphenyl Phosphite | 0.02 | 17 | 95 | 52.7 | 23.3 | 76.0 |
| 6 | 0.8 | 0.01 | do | 0.04 | do | 0.02 | [3] 24 | 99 | 62.1 | 27.2 | 89.3 |
| 7 | 0.8 | 0.01 | do | 0.04 | Triphenyl Phosphine plus Triphenyl Phosphite | 0.01 0.01 | 16 | 92 | 1.2 | 96.0 | 97.2 |
| 8 | 0.4 | 0.01 | do | 0.01 | Trimethyl Phosphite | 0.02 | 10 | 96 | 19.8 | 77.6 | 97.6 |
| 9 | 0.4 | 0.01 | Acetylacetone | 0.01 | None | | 20 | 91 | 2.6 | 26.4 | 29.0 |
| 10 | 1.2 | 0.01 | do | 0.01 | Triphenyl Phosphine | 0.01 | 3 | 95 | 24.5 | 74.2 | 98.7 |
| 11 | 0.4 | 0.01 | n-Octanoic Acid | 0.01 | Triphenyl Phosphite | 0.03 | 22 | 85 | 1.6 | 89.8 | 91.4 |
| 12 | 0.8 | 0.01 | Diethyl Malonate | 0.01 | Triphenyl Phosphine | 0.02 | 18 | 91 | 5.7 | 89.0 | 94.7 |
| 13 | 0.8 | 0.01 | Ethyl Cyanoacetate | 0.01 | do | 0.004 | 16 | [4] | 56.4 | 32.0 | 88.4 |

[1] ECH refers to ethylidenecyclohexene.
[2] Includes 3 hours of refluxing time before acid was added.
[3] Includes 2 hours of refluxing time before acid was added.
[4] Not measured.

EXAMPLE II 4-vinylcyclohexene was isomerized using a catalyst system prepared from tungsten hexacarbonyl.

A 5 g. (0.02 mole) quantity of tungsten hexacarbonyl, 50 ml. of diglyme, and 5.2 g. (0.02 mole) of triphenylphosphine were heated to 162° C. in 2 hours under a nitrogen atmosphere. The mixture was cooled to room temperature, filtered and diluted with 150 ml. absolute ethanol which precipitated the triphenylphosphine tungsten pentacarbonyl. This yellow solid was filtered and dried overnight under reduced pressure.

A 1 g. (1.7 mmole) quantity of the above prepared compound was charged into a reaction vessel together with 70 ml. (538 mmole) of 4-vinylcyclohexene and 1 g. (10 mmole) of acetylacetone. The mixture was then refluxed (at about 130° C.) for 30 hours at atmospheric pressure and under a nitrogen atmosphere.

After the reaction, the reaction mixture was analyzed by gas-liquid chromatography with the following results in weight percent.

4-vinylcyclohexene _____ 38.4
4-ethylidenecyclohexene _____ 55.7
3-ethylidenecyclohexene _____ 5.9

The above analytical results showed tungsten-containing catalyst ssytem is also effective in isomerizing 4-vinylcyclohexene.

It is not known in what precise manner the stabilizing compounds, as they are referred to herein, function, but the experimental data shown above show conclusively the effectiveness of these materials and the selectivity possible by utilizing the proper stabilizers.

The GLC (gas-liquid chromatography) analyses employed herein were carried out using a Perkin-Elmer Vapor Fractometer Model 154 using a 20-foot column which was packed with a conventional support (Chromasorb) containing 15 weight percent triscyanoethoxypropane (TCE). The analyses were carried out at 110° C. using helium carrier gas.

Reasonable variations and modifications may be made within the scope of the foregoing disclosure and the appended claims to the invention.

We claim:

1. A process for the isomerization of a vinylcyclohexene which comprises contacting said vinylcyclohexene with a catalyst formed by admixing (a) a first compound selected from the group consisting of tungsten hexacarbonyl and molybdenum hexacarbonyl, (b) a second compound selected from the group consisting of monocarboxylic acids, beta diketones, beta ketoesters and beta diesters containing from 2 to 18 carbon atoms and (c) a third compound selected from those of the formulas:

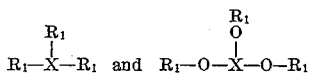

wherein each $R_1$ is selected from the group consisting of alkyl, aryl, cycloalkyl, and combinations thereof containing from 1 to 10 carbon atoms and X is selected from the group consisting of phosphorus, arsenic and antimony, the mole ratio of metal hexacarbonyl to said vinylcyclohexene being in the range of 0.001 to 0.1 and the reaction temperature in the range of 100° to 300° C.

2. A process according to claim 1 wherein said second compound is selected from the group consisting of ethyl acetoacetate, acetylacetone, n-octanoic acid, diethyl malonate, and ethyl cyanoacetate.

3. A process according to claim 1 wherein said third compound is selected from the group consisting of triphenyl phosphine, trimethyl phosphite and triphenyl phosphite.

4. A process for the isomerization of 4-vinylcyclohexene which comprises contacting vinylcyclohexene with a catalyst formed on contacting a first compound selected from the group consisting of molybdenum hexacarbonyl, tungsten hexacarbonyl, a second compound selected from the group consisting of ethyl acetoacetate, acetylacetone, n-octanoic acid, diethyl malonate, ethyl cyanoacetate and at least one stabilizer compound selected from the group consisting of triphenyl phosphine, trimethyl phosphite and triphenyl phosphite wherein the mole ratio of said first compound to said vinylcyclohexene is in the range of 0.001 to 0.1, the mole ratio of said second compound to said first compound is in the range of 0.5:1 to 100:1, the mole ratio of said stabilizer to said second compound is in the range of 0.5:1 to 2.0:1 and the reaction temperature is in the range of 100° to 300° C.

5. A catalyst system which consists of a mixture of a first compound selected from the group consisting of tungsten hexacarbonyl, and molybdenum hexacarbonyl, a second compound selected from the group consisting of monocarboxylic acids, beta diketones, beta ketoesters and beta diesters containing from 2 to 18 carbon atoms and a stabilizer selected from compounds of the formulas

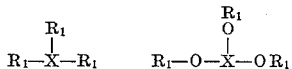

wherein each $R_1$ is selected from the group consisting of alkyl, aryl, cycloalkyl, and combinations thereof containing from 1 to 10 carbon atoms, inclusive and X is selected from the group consisting of phosphorus, arsenic and antimony wherein the mole ratio of said Group VIB metal hexacarbonyl to said olefinic hydrocarbon is in the range of 0.001 to 0.1, the mole ratio of said second compound to Group VIB metal hexacarbonyl is in the range of 0.5:1 to 100:1, and the mole ratio of said stabilizer to second compound is in the range of 0.5:1 to 2.0:1.

6. A catalyst system according to claim 5 wherein said second compound is selected from the group consisting of ethyl acetoacetate, acetylacetone, n-octanoic acid, diethyl malonate, and ethyl cyanoacetate.

7. A catalyst system according to claim 5 wherein said third compound is selected from the group consisting of triphenyl phosphine, trimethyl phosphite and triphenyl phosphite.

8. A catalyst system consisting of (1) a compound selected from the group consisting of chromium hexacarbonyl, tungsten carbonyl, and molybdenum hexacarbonyl, (2) a second compound selected from the group consisting of ethylacetoacetate, acetylacetone, n-octanoic acid, diethyl malonate, and ethylcyanoacetate and (3) at least one stabilizer compound selected from the group consisting of triphenyl phosphine, trimethyl phosphite and triphenyl phosphite, wherein the mole ratio of said second compound to Group VIB metal hexacarbonyl is in the range of 0.5:1 to 100:1, and the mole ratio of said stabilizer to second compound is in the range of 0.5:1 to 2.0:1.

References Cited
UNITED STATES PATENTS

| | | | |
|---|---|---|---|
| 3,065,250 | 11/1962 | Levering | 252—431 |
| 3,080,432 | 3/1963 | Voltz et al. | 260—666 |
| 3,083,246 | 3/1963 | Holzman | 260—683.15 |
| 3,102,899 | 9/1963 | Cannell | 252—431 |
| 3,135,776 | 6/1964 | Ecke | 260—673.5 |
| 3,139,460 | 6/1964 | Eisenmann | 260—683.2 |
| 3,187,062 | 6/1965 | Shechter | 252—431 |
| 3,320,294 | 5/1967 | Larson | 252—431 |
| 3,326,949 | 6/1967 | Larson | 252—431 |

DELBERT E. GANTZ, *Primary Examiner.*

V. O'KEEFE, *Assistant Examiner.*